(12) United States Patent
Lassen et al.

(10) Patent No.: US 8,935,271 B2
(45) Date of Patent: Jan. 13, 2015

(54) EXTRACT OPERATOR

(71) Applicants: Soren Bogh Lassen, San Francisco, CA (US); Sandhya Kunnatur, Mountain View, CA (US); Michael Curtiss, Palo Alto, CA (US)

(72) Inventors: Soren Bogh Lassen, San Francisco, CA (US); Sandhya Kunnatur, Mountain View, CA (US); Michael Curtiss, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/723,861

(22) Filed: Dec. 21, 2012

(65) Prior Publication Data
US 2014/0181091 A1    Jun. 26, 2014

(51) Int. Cl.
*G06F 17/30*    (2006.01)
(52) U.S. Cl.
CPC ................................. *G06F 17/30477* (2013.01)
USPC ........... 707/758; 707/737; 707/767; 707/607; 707/742; 707/781
(58) Field of Classification Search
CPC ................................................ G06F 17/30477
USPC ......... 707/607, 706, 713, 758, 781, 742, 737, 707/767
See application file for complete search history.

(56) References Cited

U.S. PATENT DOCUMENTS

| 8,244,749 | B1 | 8/2012 | Das | |
| 2010/0169343 | A1* | 7/2010 | Kenedy et al. | 707/758 |
| 2011/0289063 | A1 | 11/2011 | Radlinski | |
| 2012/0102014 | A1 | 4/2012 | Franks | |
| 2012/0131034 | A1* | 5/2012 | Kenedy et al. | 707/767 |
| 2012/0137367 | A1* | 5/2012 | Dupont et al. | 726/25 |
| 2012/0239645 | A1 | 9/2012 | Li | |
| 2013/0132392 | A1* | 5/2013 | Kenedy et al. | 707/737 |
| 2013/0151533 | A1* | 6/2013 | Udupa et al. | 707/742 |

FOREIGN PATENT DOCUMENTS

KR    10-2010-0134970    12/2010

OTHER PUBLICATIONS

International Search Report and Written Opinion for International Application PCT/US2013/074592, Mar. 20, 2014.
U.S. Appl. No. 13/560,889, filed Jul. 27, 2012, Sankar.
U.S. Appl. No. 13/560,212, filed Jul. 27, 2012, Lassen.

* cited by examiner

*Primary Examiner* — Sana Al Hashemi
(74) *Attorney, Agent, or Firm* — Baker Botts L.L.P.

(57) ABSTRACT

In one embodiment, a method includes receiving a search query requesting first search results of a first object type. The search query includes an inner query requesting second search results of a second object type. The method includes accessing an inverted index of a data store corresponding to the second object type; retrieving the second search results requested by the inner query using the inverted index of the data store corresponding to the second object type; accessing a forward index of the data store corresponding to the second object type; retrieving the first search results requested by the search query using the second search results and the forward index of the data store corresponding to the second object type.

20 Claims, 5 Drawing Sheets

EXTRACT OPERATOR

TECHNICAL FIELD

This disclosure generally relates to a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments may receive a search query requesting first search results of a first object type, while the search query may comprise an inner query requesting second search results of a second object type. Particular embodiments may access an inverted index of a data store corresponding to the second object type, and retrieve the second search results requested by the inner query. Particular embodiments may access a forward index of the data store, and retrieve the first search results using the second search results.

DESCRIPTION OF EXAMPLE EMBODIMENTS

Figure 1:
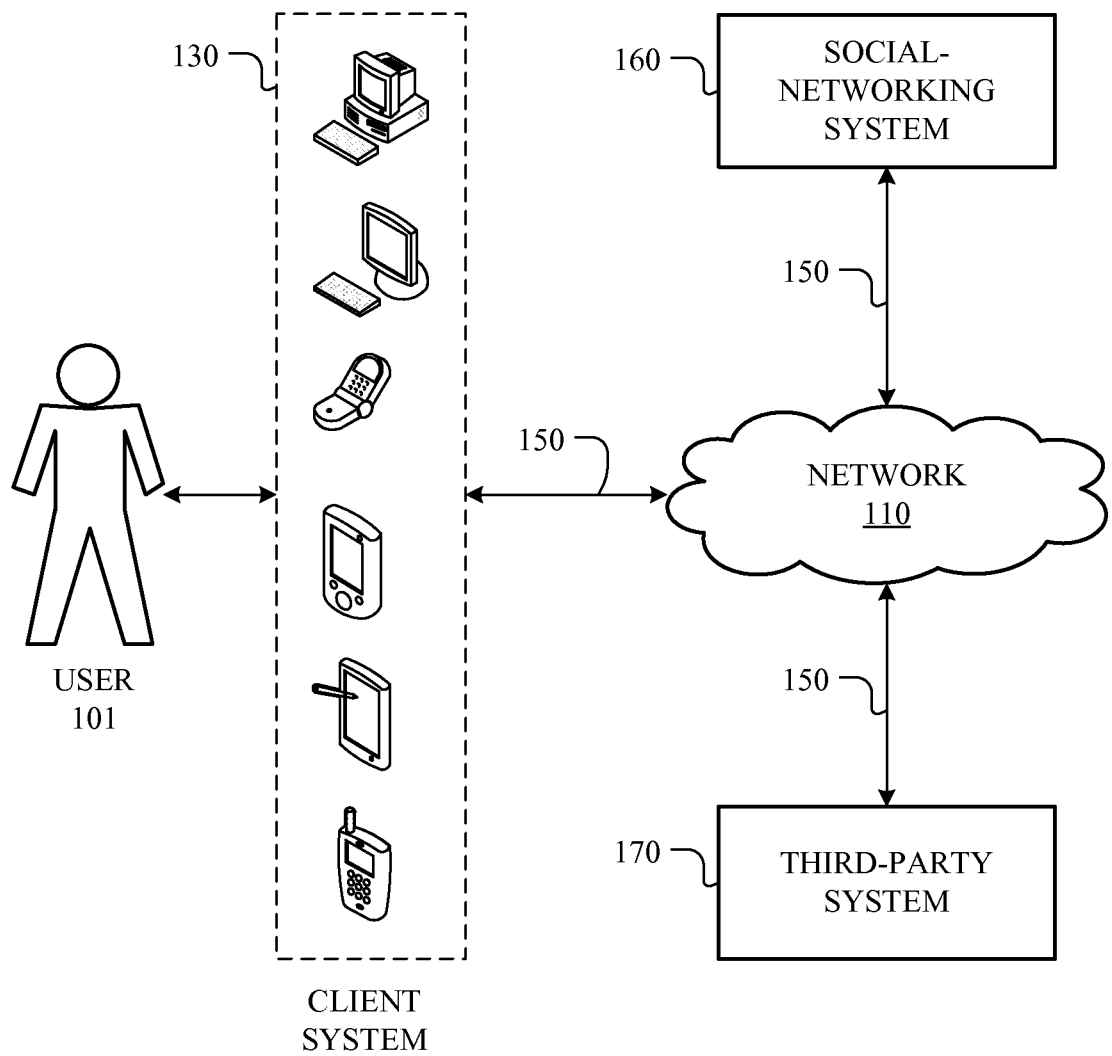
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host websites or applications. Third-party system 170 may generate, store, receive, and transmit third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
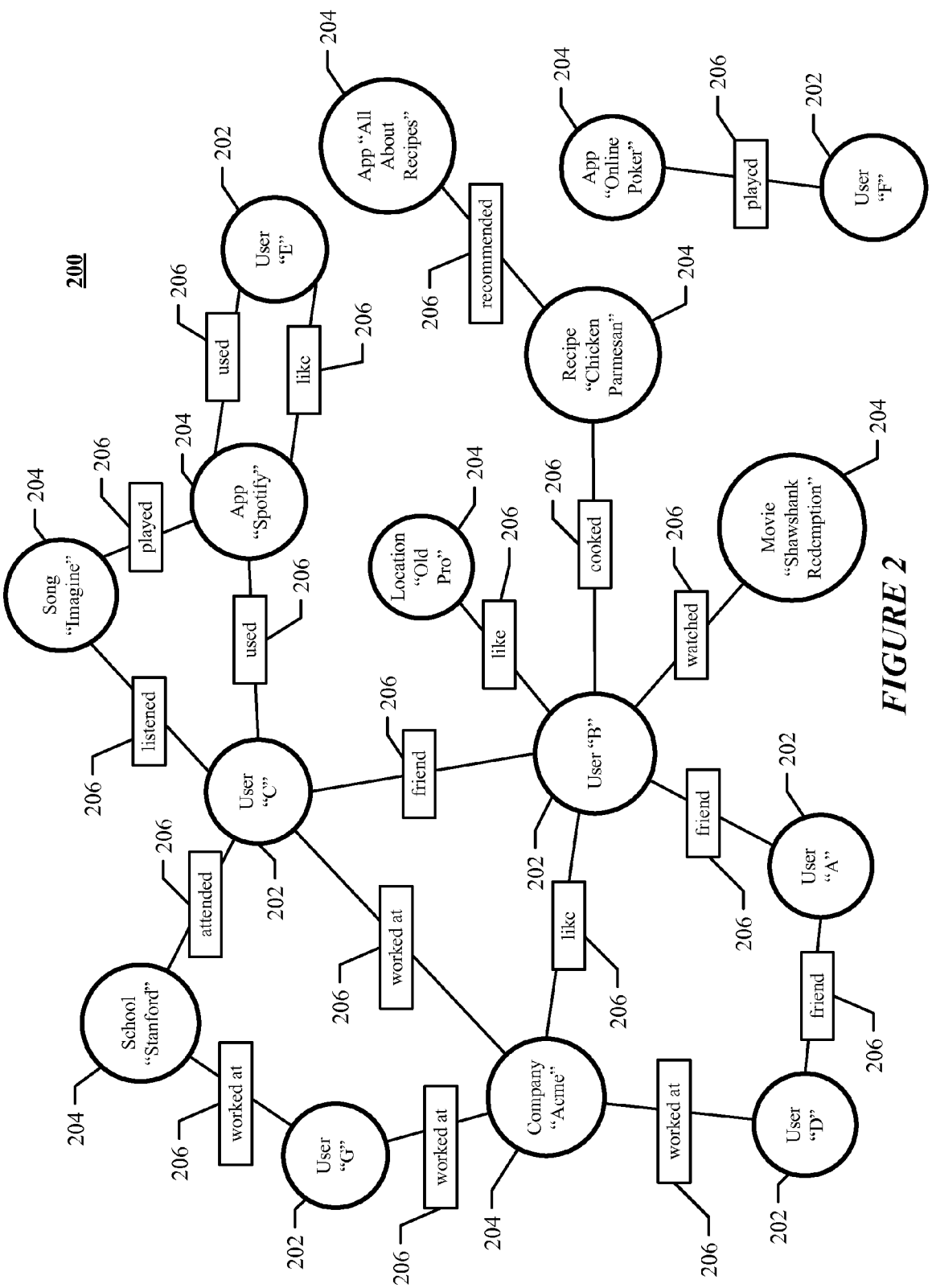
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

The amount of data (e.g., data for a social graph) stored by a social-networking system may be very large. For example, a social graph used by Facebook of Menlo Park, Calif. can have a number of nodes in the order of $10^8$, and a number of edges in the order of $10^{10}$. Typically, a large collection of data such as a large database may be divided into a number of partitions. Each partition may be held by separate servers or at separate physical locations. As the index for each partition of a database is smaller than the index for the overall database, the partitioning may improve performance in accessing the database. As the partitions may be distributed over a large number of servers (while each partition may be duplicated at geographically diverse locations), the partitioning may also improve performance and reliability in accessing the database. Ordinarily, a database may be partitioned by storing rows (or columns) of the database separately. A database may also be partitioned by using a hashing algorithm. A database may also be partitioned by some real-world segmentation of the data held by the database (e.g., customers in each time zone of the United States). Particular embodiments may partition storage of a collection of data based on object types.

Particular embodiments may store data objects in a plurality of partitions, each partition holding data objects corresponding to a single object type.

Figure 3:
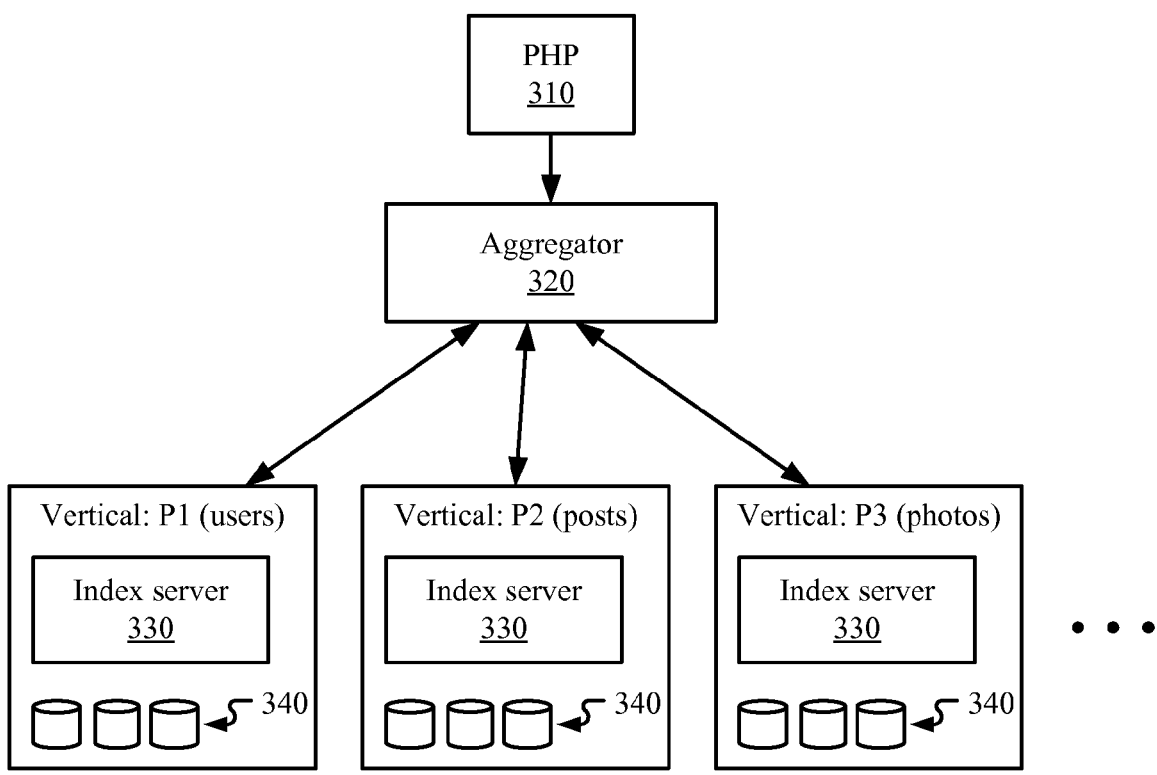
FIG. 3 illustrates an example partitioning for storing objects of a social-networking system.

FIG. 3 illustrates an example partitioning for storing objects of a social-networking system. In the example of FIG. 3, a plurality of data stores or verticals (e.g., P1, P2, P3, and so on) may store objects of a social networking system. In particular embodiments, each data store may be configured to store objects of a particular one of a plurality of object types in respective data storage devices 340. Each data store may also be configured to store in data storage devices 340 information associated with each stored object. An object type may be user, photo, post, web page, or application. Other examples of object types may be music, comment, event, message, offer (e.g., coupon), and review. This disclosure contemplates any suitable object types for a social-networking system.

For example, a user vertical P1 illustrated in FIG. 3 may store user objects. Each user object stored in the user vertical P1 may comprise an identifier (e.g., a character string), a user name, and a profile picture for a user of the social-networking system. The social-networking system may also store in the user vertical P1 information associated with a user object such as language, location, education, one or more email addresses, interests, relationship status, a list of friends, a list of family members, privacy settings, and so on. For example, a post vertical P2 illustrated in FIG. 3 may store post objects. Each post object stored in the post vertical P2 may comprise an identifier, a text string for a post posted to the social-networking system. The social-networking system may also store in the post vertical P2 information associated with a post object such as a time stamp, an author, privacy settings, users who like the post, a count of likes, comments, a count of comments, location, and so on. For example, a photo vertical P3 may store photo objects (or objects of other media types such as video or audio). Each photo object stored in the photo vertical P3 may comprise an identifier and a photo. The social-networking system may also store in the photo vertical P3 information associated with a photo object such as a time stamp, an author, privacy settings, users who are tagged in the photo, users who like the photo, comments, and so on.

In particular embodiments, objects stored in each vertical may be indexed by one or more search indices. The search indices may be hosted by respective index server 330 comprising one or more computing devices (e.g., servers). The index server 330 may update the search indices based on data (e.g., a photo and information associated with a photo) submitted to the social-networking system by users or other processes of the social-networking system (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object type may comprise a plurality of physical or logical partitions, each comprising respective search indices.

In particular embodiments, the search indices for a vertical corresponding to a first object type may comprise an inverted index. The inverted index may map a search term associated with a second object type to one or more search results of the first object type. For example, an inverted index in the post vertical P2 illustrated in FIG. 3 may map a search term associated with a user such as (posts_liked_by:<user>) from <user> to a list posts liked by <user>. The inverted index may map a search term associated with a user such as <posts commented by:<user>) from <user> to a list of posts commented by <user>. For example, an inverted index in the photo vertical P3 illustrated in FIG. 3 may map a search term associated with a user such as (photos_liked_by:<user>) from <user> to a list of photos liked by <user>. The inverted index may map a search term associated with a user (photos_tagged_with:<user>) from <user> to a list of photos that <user> is tagged in. In one embodiment, an inverted index for a vertical corresponding to a particular object type may map a search term associated with the particular object type to one or more search results of the same particular object type. For example, an inverted index in the user vertical P1 illustrated in FIG. 3 may map a search term associated with a user such as (friends:<user>) from <user> to a list of friends (i.e., of user object type) of <user>.

In particular embodiments, the search indices for a vertical corresponding to a first object type may comprise a forward index. The forward index may map a search term associated with the first object type to one or more search results of a second object type. For example, a forward index in the post vertical P2 may map a search term associated with a post such as (likers_of:<post>) from <post> to a list of users who like <post>. The forward index may map a search term associated with a post such as (author_of:<post>) from <post> to a user who is the author of <post>. For example, a forward index in the photo vertical P3 may map a search term associated with a photo such as (tagged_in:<photo>) from <photo> to a list of users who are tagged in <photo>. The forward index may map a search term associated with a photo (commenters_of: <photo>) from <photo> to a list of users who comment on <photo>. A forward index may comprise a one-to-one mapping for a search term. A forward index may also comprise a one-to-few mapping for a search term. On the other hand, an inverted index may map one to many for a search term. For example, a forward index of the photo vertical P3 may map a photo to an owner of the photo (e.g., the user who uploaded the photo to the social-networking system). For example, a forward index in the photo vertical P3 may map a photo to a few users (e.g., less than 10 users) who are tagged in the photo. On the other hand, for example, an inverted index of the photo vertical P3 may map a user to many photos (e.g., more than 100 photos) that the user is tagged in.

Figure 4:
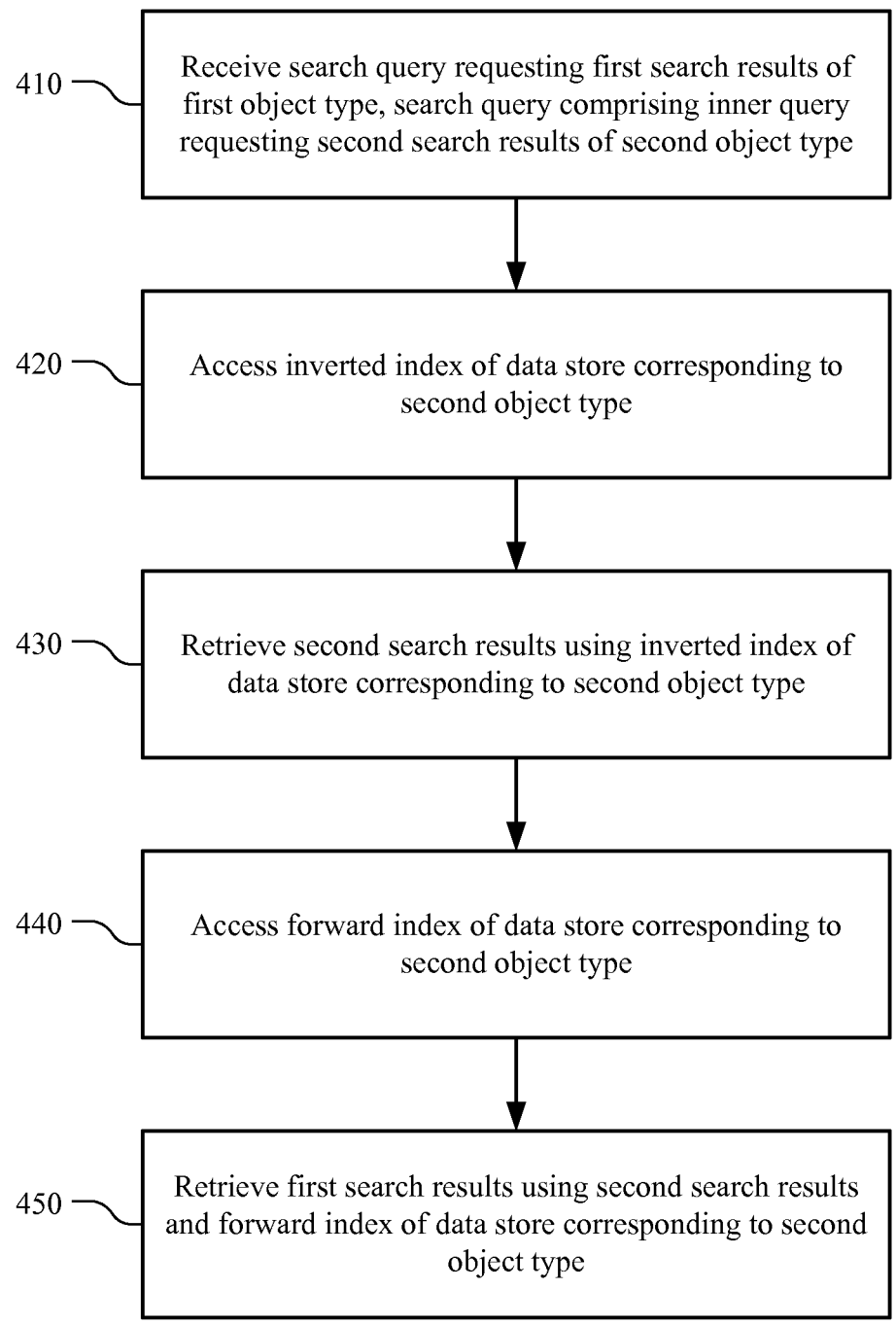
FIG. 4 illustrates an example method for searching using a forward index.

Particular embodiments describe methods for efficient search using a forward index. FIG. 4 illustrates an example method 400 for searching using a forward index. The method 400 may be implemented by one or more computing device (e.g., servers) of the social-networking system. The method 400 may begin at step 410. In particular embodiments, at step 410, one or more computing devices may receive a search query requesting one or more first search results of a first object type. The search query may comprise an inner query requesting one or more second search results of a second object type. For example, an aggregator process 320 illustrated in FIG. 3 may receive a search query (extract author (term posts_liked_by:<9>)). The search query may request (with an extract operator) a search result in one or more authors for posts that are liked by a user with a user identifier of <9>. The search query may include an inner query (term posts_liked_by:<9>) corresponding to a search term that requests search results in posts that are liked by the user <9>. That is, the search query requests a first search result of a first object type (user), while the inner query requests second search results of a second object type (post).

The aggregator process 320 may be one or more computing processes hosted by one or more computing devices (e.g., servers) of the social-networking system. For example, the aggregator process 320 may determine the search query based on a search request from a PHP (Hypertext Preprocessor)

process 310 illustrated in FIG. 3. The PHP process 310 may be one or more computing processes hosted by one or more computing devices (e.g., servers) of the social-networking system. The search request may be a structured or a substantially unstructured text string submitted to the PHP process by a user or another process of the social-networking system (or a third-party system). For example, the aggregator process 320 may determine the search query (extract author (term posts_liked_by:<9>)) based on a search request "Who are the authors of the posts I like" submitted to the PHP process 310 by the user <9>.

In particular embodiments, at step 420, one or more computing devices may access an inverted index of a data store corresponding to the second object type. In particular embodiments, at step 430, one or more computing devices may retrieve the second search results requested by the inner query using the inverted index of the data store corresponding to the second object type. For example, the aggregator process 320 may submit the search query (extract author (term posts_liked_by:<9>)) described above to the post vertical P2 illustrated in FIG. 3, causing the index server 330 of the post vertical P2 to access an inverted index of the post vertical P2. The inverted index may map a search term (posts_liked_by:<user>) associated with <user> to a list of posts_liked_by <user>. The index server may access the inverted index and retrieve a list of posts_liked_by the user <9> as requested by the inner search query (term posts_liked_by:<9>). For example, the list of posts liked by the user <9> may include posts with identifiers <1000>, <2000>, <3000>, <4000>, <5000>, and <6000>.

In particular embodiments, at step 440, one or more computing devices may access a forward index of the data store corresponding to the second object type. In particular embodiments, at step 450, one or more computing device may retrieve the first search results requested by the search query using the second search results and the forward index of the data store corresponding to the second object type. For example, the index server of the post vertical P2 described above may access a forward index of the post vertical P2. The forward index may map a search term (author:<post>) associated with <post> to an author of <post>. The index server may access the forward index (using the extract operator described earlier) with the result list of posts (<1000>, <2000>, <3000>, <4000>, <5000>, <6000>) for the inner search query (term posts_liked_by:<9>), and retrieve a list of respective authors (e.g., <31>, <41>, <51>) for the list of posts (<1000>, <2000>, <3000>, <4000>, <5000>, <6000>).

As described earlier, the post vertical P2 may comprise a plurality of physical or logical partitions, each comprising respective search indices. The aggregator process may submit the search query (extract author (term posts_liked_by:<9>)) to each partition of the post vertical P2. The index server of each partition may access an inverted index and a forward index of the each partition, and return search results to the aggregator as described above. The aggregator process may then aggregate the search results from the partitions. For example, a first partition may return search results of authors <31> and <51>. A second partition may return search results of authors <41> and <51>. The aggregator process may aggregate the results (e.g., by performing an OR operation) yielding an aggregated results of <31>, <41>, and <51>.

With a forward index, the method of FIG. 4 may improve search performance as a complex search query (e.g., a query comprising two or more search queries) may only require accessing one vertical corresponding to one particular object type. To the contrary, without a forward index, a complex search query may require accessing two or more verticals, each corresponding to a different particular object type. As an example, for a complex search query such as searching for authors of posts liked by the user <9> described above, the aggregator process may first submit first search query (term posts_liked_by:<9>) to the post vertical P2. The index server of the post vertical P2 may access an inverted index of the post vertical P2 (that maps a user to posts liked by the user) with the first search query, and return to the aggregator process a list of posts (e.g., <1000>, <2000>, <3000>, <4000>, <5000>, <6000>) liked by the user <9>. The aggregator process then submit a second set of search queries (term author: <1000>), (term author:<2000>), (term author:<3000>), and so on, to the user vertical P1. That is, without a forward index in the post vertical P2, the aggregator process may be required to look up the user vertical P1 not only once but multiple times. The index server of the user vertical P1 may access an inverted index of the user vertical P1 (that maps a post to its author), and return to the aggregator process a list of authors (e.g., <31>, <41>, <51>) for the list of posts (<1000>, <2000>, <3000>, <4000>, <5000>, <6000>).

In addition, as described earlier, a forward index may indexes search terms that are one-to-one or one-to-few. Thus a forward index of a vertical may be considerably smaller than an inverted index of a vertical that may indexes search terms that have one-to-many mappings. The forward index may thus further improve search performance as its smaller size may improve access and retrieval time for search queries.

In particular embodiments, the aggregator process may rank the first search results by accessing at least another data store corresponding to the first object type. For example, the aggregator process may submit the list of authors (<31>, <41>, <51>) described above to the user vertical P1. A server process (hosted by one or more computing devices of the social-networking system) may rank the authors <31>, <41>, and <51> based on their respective relationship to the user <9> of the search query (extract author (term posts_liked_by:<9>)). For example, the server process may rank an author higher if the server process determines (e.g., by accessing one or more search indices) that the author is a family member of the user <9>. For example, the server process may rank an author higher if the server process determines (e.g., by accessing one or more search indices) that the author has more than a pre-determined number (e.g., 3) of common interests (or common first-degree friends). The server process may return a ranking order between the authors <31>, <41>, and <51> to the aggregator process.

In other embodiments, one or more computing device (e.g., an index server) of the data store corresponding to the second object type may rank the first search results. For example, the index server of the post vertical P2 may rank the search results of authors <31>, <41>, and <51> described above based on a number of posts in the list of posts liked by the user <9> (<1000>, <2000>, <3000>, <4000>, <5000>, <6000>) they author. For example, if user <41> authors posts <1000>, <2000>, <3000>, user <31> authors posts <5000> and <6000>, and user <51> authors post <4000>, the index server may rank user <41> as highest as user <41> authors most of the posts in the list of posts liked by the user <9>. The index server may return a ranked search result (<41>, <31>, <51>) as the first search result to the aggregator process. For another example, the index server may access a forward index that maps a post to a count of likes of the post. The index server may access the forward index and retrieve counts of likes for each post of the list of posts liked by the user <9>. The index server may rank the posts in the list of posts based on respective counts of likes, and return to the aggregator process authors of top ranked posts (e.g., top 3 ranked or most liked posts) as the first search result.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
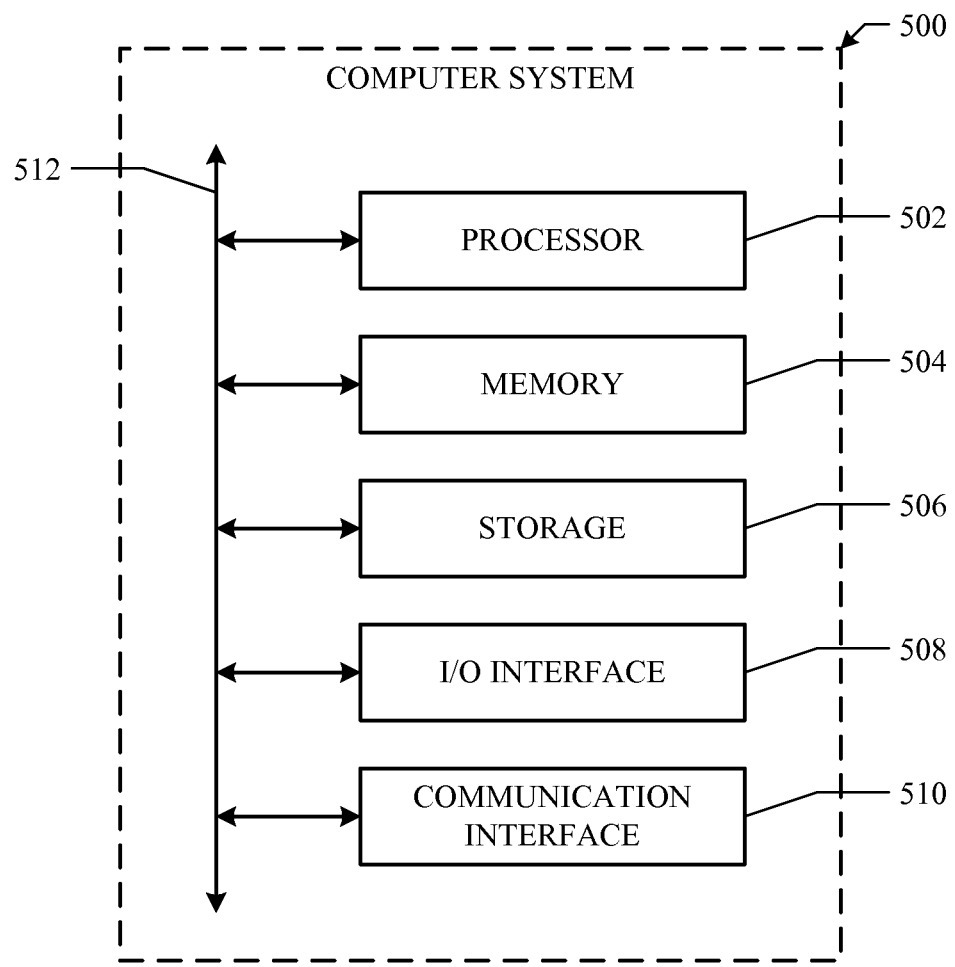
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, receiving a search query requesting one or more first search results of a first object type that corresponds to a user in a social-networking system, the search query comprising an inner query identifying a specified user and requesting one or more second search results of a second object type that corresponds to a concept in the social-networking system;
by one or more computing devices, accessing an inverted index of a data store corresponding to the second object type, wherein the inverted index maps a user node to one or more concept nodes in accordance with a second relationship;
by one or more computing devices, retrieving the one or more second search results requested by the inner query using the inverted index of the data store corresponding to the second object type, wherein the one or more second search results comprise one or more concept nodes of a social graph in the social-networking system, and the one or more concept nodes are related to the specified user by the second relationship;
by one or more computing devices, accessing a forward index of the data store corresponding to the second object type, wherein the forward index maps a concept node to one or more user nodes in accordance with a first relationship; and
by one or more computing devices, retrieving the one or more first search results requested by the search query using the second search results and the forward index of the data store corresponding to the second object type, wherein the one or more first search results comprise one or more user nodes of the social graph that are related to the one or more resulting concept nodes by the first relationship.

2. The method of claim 1, wherein the concept comprises a photo, post, web page, or application.

3. The method of claim 1, further comprising, by one or more computing devices, ranking the first search results by:
accessing a data store corresponding to the first object type;
determining respective relationships of the first search results to an element of the inner query using the data store corresponding to the first object type; and
ranking the first search results based on the respective relationships of the first search results to the element of the inner query.

4. The method of claim 1, wherein the inverted index maps a search term associated with the first object type to one or more search results of the second object type, and the search term identifies the first relationship.

5. The method of claim 1, wherein the forward index maps a search term associated with the second object type to one or more search results of the first object type, and the search term identifies the second relationship.

6. The method of claim 1, wherein the search query is directed to objects within a social network of the social-networking system.

7. The method of claim 1, wherein the social-networking system comprises the computing devices and the data store.

8. One or more computer-readable non-transitory storage media embodying software that is operable when executed by one or more computing devices to:
receive a search query requesting one or more first search results of a first object type that corresponds to a user in a social-networking system, the search query comprising an inner query identifying a specified user and requesting one or more second search results of a second object type that corresponds to a concept in the social-networking system;
access an inverted index of a data store corresponding to the second object type, wherein the inverted index maps a user node to one or more concept nodes in accordance with a second relationship;
retrieve the one or more second search results requested by the inner query using the inverted index of the data store corresponding to the second object type, wherein the one or more second search results comprise one or more concept nodes of a social graph in the social-networking system, and the one or more concept nodes are related to the specified user by the second relationship;
access a forward index of the data store corresponding to the second object type, wherein the forward index maps a concept node to one or more user nodes in accordance with a first relationship; and
retrieve the one or more first search results requested by the search query using the second search results and the forward index of the data store corresponding to the second object type, wherein the one or more first search results comprise one or more user nodes of the social graph that are related to the one or more resulting concept nodes by the first relationship.

9. The media of claim 8, wherein the concept comprises a photo, post, web page, or application.

10. The media of claim 8, wherein the software is further operable when executed to rank the first search results by:
accessing a data store corresponding to the first object type;
determining respective relationships of the first search results to an element of the inner query using the data store corresponding to the first object type; and
ranking the first search results based on the respective relationships of the first search results to the element of the inner query.

11. The media of claim 8, wherein the inverted index of the data store maps a search term associated with the first object type to one or more search results of the second object type, and the search term identifies the first relationship.

12. The media of claim 8, wherein the forward index maps a search term associated with the second object type to one or more search results of the first object type, and the search term identifies the second relationship.

13. The media of claim 8, wherein the search query is directed to objects within a social network of the social-networking system.

14. The media of claim 8, wherein the social-networking system comprises the computing devices and the data store.

15. A system comprising:
one or more processors; and
a memory coupled to the processors comprising instructions executable by the processors, the processors being operable when executing the instructions to:
receive a search query requesting one or more first search results of a first object type that corresponds to a user in a social-networking system, the search query comprising an inner query identifying a specified user and requesting one or more second search results of a second object type that corresponds to a concept in the social-networking system;

access an inverted index of a data store corresponding to the second object type, wherein the inverted index maps a user node to one or more concept nodes in accordance with a second relationship;

retrieve the one or more second search results requested by the inner query using the inverted index of the data store corresponding to the second object type, wherein the one or more second search results comprise one or more concept nodes of a social graph in the social-networking system, and the one or more concept nodes are related to the specified user by the second relationship;

access a forward index of the data store corresponding to the second object type, wherein the forward index maps a concept node to one or more user nodes in accordance with a first relationship; and retrieve the one or more first search results requested by the search query using the second search results and the forward index of the data store corresponding to the second object type, wherein the one or more first search results comprise one or more user nodes of the social graph that are related to the one or more resulting concept nodes by the first relationship.

16. The system of claim 15, wherein the concept comprises a photo, post, web page, or application.

17. The system of claim 15, wherein the processors are further operable when executing the instructions to rank the first search results by:

accessing a data store corresponding to the first object type;

determining respective relationships of the first search results to an element of the inner query using the data store corresponding to the first object type; and ranking the first search results based on the respective relationships of the first search results to the element of the inner query.

18. The system of claim 15, wherein the inverted index of the data store maps a search term associated with the first object type to one or more search results of the second object type, and the search term identifies the first relationship.

19. The system of claim 15, wherein the forward index of the data store maps a search term associated with the second object type to one or more search results of the first object type, and the search term identifies the second relationship.

20. The system of claim 15, wherein the search query is directed to objects within a social network of the social-networking system.

* * * * *